July 16, 1957   A. J. BELASKAS   2,799,396
APPARATUS FOR TREATING IMPURE LIQUIDS CONTAINING SUSPENDED SOLIDS
Filed Aug. 20, 1953   3 Sheets-Sheet 2

INVENTOR.
ANTHONY J. BELASKAS
BY
ATTORNEY

INVENTOR.
ANTHONY J. BELASKAS 2,799,396
Patented July 16, 1957

United States Patent Office

2,799,396
APPARATUS FOR TREATING IMPURE LIQUIDS CONTAINING SUSPENDED SOLIDS

Anthony J. Belaskas, East Chicago, Ind., assignor to The Cincinnati Butchers' Supply Company, Cincinnati, Ohio, a corporation of Ohio Application August 20, 1953, Serial No. 375,538

9 Claims. (Cl. 210—221)

This invention relates to apparatus for economically and efficiently treating impure liquids containing suspended solids.

An object of the invention is to provide an inexpensive, highly efficient unit for continuously treating impure liquids containing suspended solids, such as, by way of example, the influent from rendering plants, slaughtering plants, combined slaughter and processing plants, sausage manufacturing plants, and the like.

Another object of the invention is to provide a unit having the hereinabove described characteristics and which includes a settling or clarifier chamber of novel construction in which the floatable and heavier suspended solids entrained in the influent are separated out leaving a clarified effluent substantially free of entrained solids. The floatable solids rise to the top where they are skimmed off into a trough for further treatment or discard; the heavier, settleable solids settle to the bottom as sludge which is drawn off and deposited in suitable drying beds. By means of a unique baffling system interiorly of the settling chamber only the aforementioned clarified wastes are permitted to pass over into an aeration chamber in which the oxygen demand of the waste is satisfied for rendering it stable.

Still a further object of the invention is to provide a unit for treating impure liquids containing suspended solids, wherein the aeration chamber is provided with a peripheral weir characterized by its extreme length, and over which the clarified and stabilized effluent passes as a fine spray.

Still another object of the invention is to teach a method of efficiently treating impure liquids containing suspended solids whereby the BOD of the effluent will be sufficiently low to permit its discharge directly into streams and/or sewage systems, and wherein the suspended solids, per million parts of effluent, have likewise been reduced to a minimum in compliance with the requirements of the various sanitary codes.

These and other objects are attained by the means described herein and as disclosed in the accompanying drawings, in which.

Figure 3:
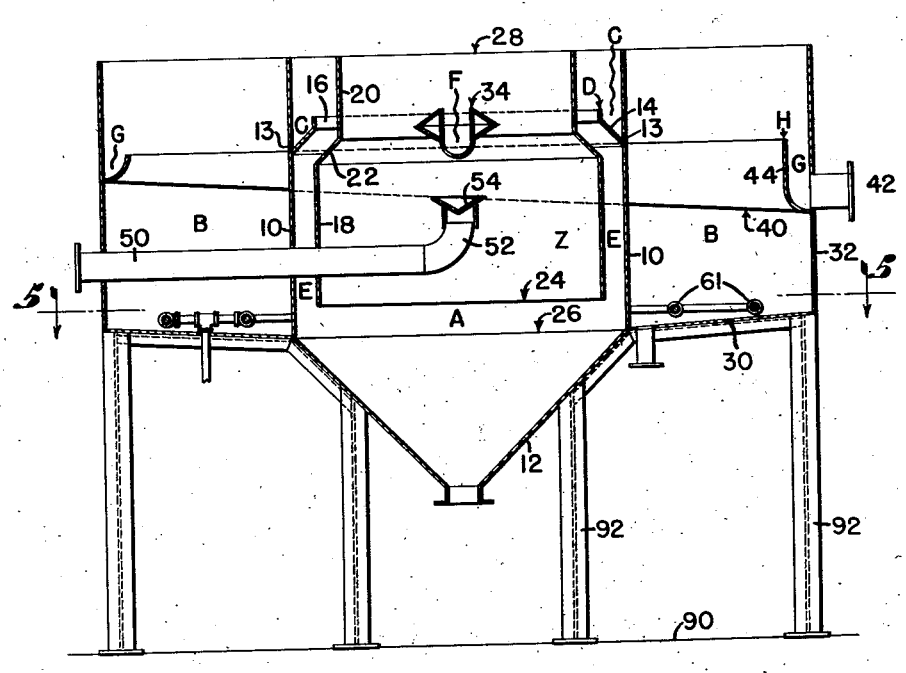
Fig. 3 is an enlarged vertical section of the unit of Fig. 1.

With particular reference now to Fig. 3, the letter A denotes generally the settling or clarifier chamber, and the letter B the aeration chamber.

The settling chamber may be fabricated from sheet metal whereby to provide a substantially cylindrical body portion defined by upstanding walls 10, and a conical lower portion defined by downwardly tapering walls 12 which define a conical sludge accumulator chamber directly beneath and in open communication with the cylindrical body portion defined by upstanding walls 10.

An annular trough denoted generally by the letter C is concentric with and disposed interiorly of the cylindrical body portion. The outer wall of said trough may comprise a portion of vertical wall 10, to which the lower end of an upwardly and inwardly inclined wall 14 is rigidly affixed. The upper end of inclined wall 14 is preferably provided with an upstanding, vertical portion 16, the free upper edge of which defines a peripheral weir D. A plurality of apertures or ports 13 are provided through wall 10 adjacent the lower portion of trough C.

An open-ended baffle member defined by imperforate cylindrical walls 18 and 20 interconnected by intermediate conical wall 22 is disposed in spaced, concentric relationship with the walls of the body portion, for thereby subdividing the settling chamber into a central zone Z interiorly of the baffle member, and an outer zone E exteriorly of said member. The outer zone E comprises an annular passageway between adjacent faces of the corresponding walls of the baffle, chamber and trough.

It will be noted that walls 18 of the baffle member have been disposed in spaced parallelism with walls 10, and that wall 22 is in spaced parallelism with inclined wall 14 of trough C, and that walls 20 are in spaced parallelism with upstanding walls 16 of said trough.

The open lower end 24 of the baffle member is positioned interiorly of and terminates at an elevation above the lower end 26 of the cylindrical body portion and well above the highest level to which the sludge deposited on the bottom walls of the chamber is permitted to accumulate. The upper end 28 of the baffle member is disposed above upper edge D of the peripheral weir, upper edge 28 being in substantial alignment with the upper end of wall 10.

The aeration chamber B circumscribes the settling chamber A, and in the preferred embodiment of the invention wall 10 may be common to both of said chambers. Lower wall 30 of the aeration chamber may be disposed in substantial alignment with the lower end 26 of the cylindrical body portion of chamber A. Outer wall 32 is disposed in spaced relationship with wall 10, the upper end of wall 32 terminating in the plane of the upper ends of walls 10 and 20.

A scum trough F is disposed diametrically across and in spanning relationship with the upper cylindrical portion 20 of the baffle member, the upper edges 34 of the trough being disposed just above the upper edge D of annular trough C.

Figure 1:
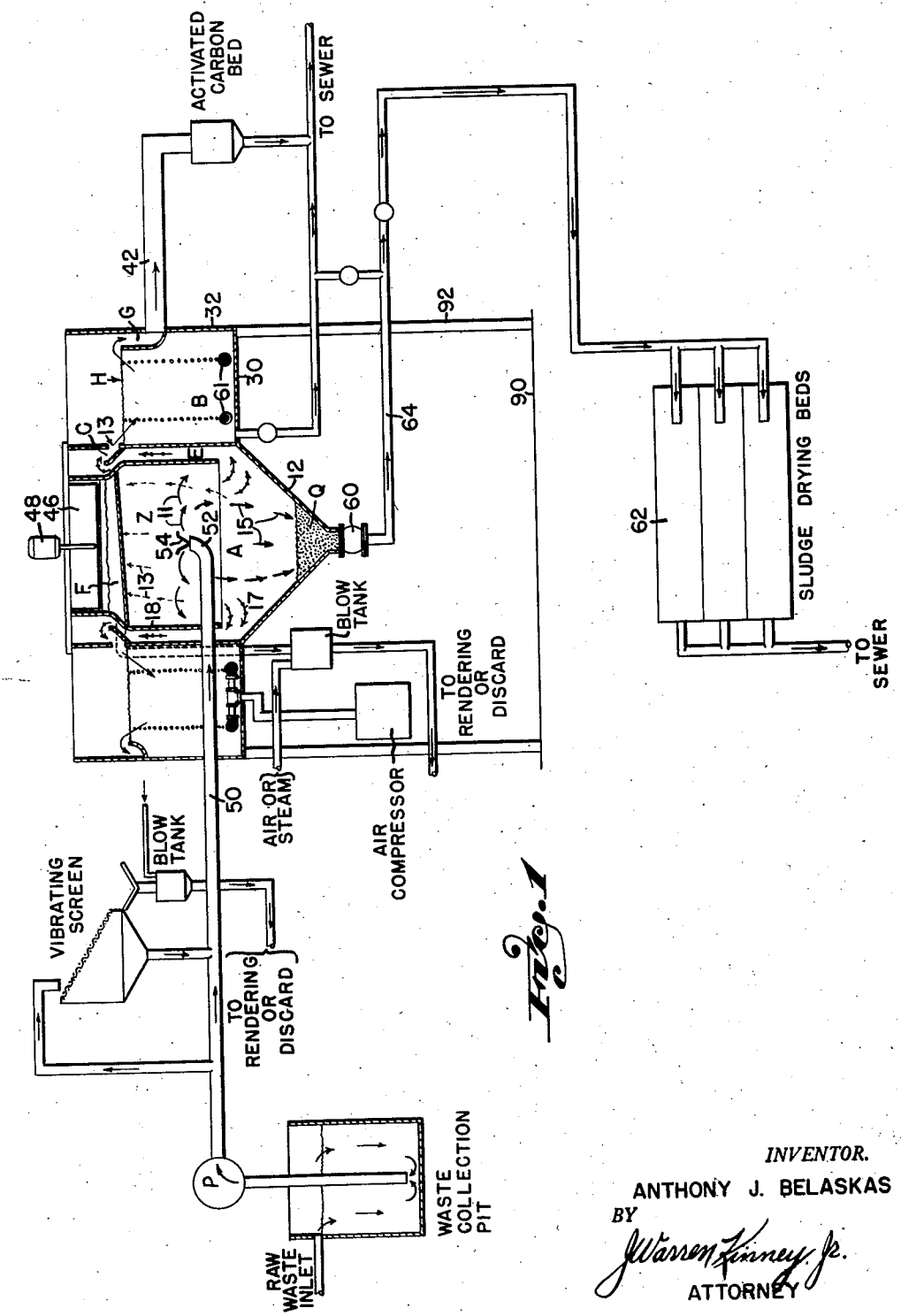
Fig. 1 is a schematic view of a typical installation incorporating the unit embodying the teachings of the present invention, parts thereof having been indicated in section for clarity of detail and understanding.
Figure 2:
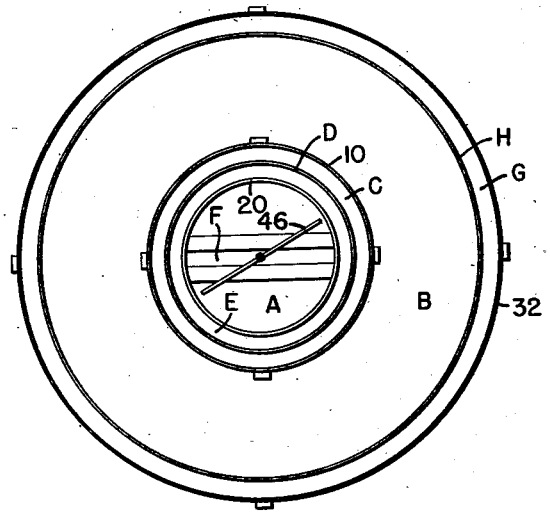
Fig. 2 is a top diagrammatic view of the unit of Fig. 1.
Figure 4:
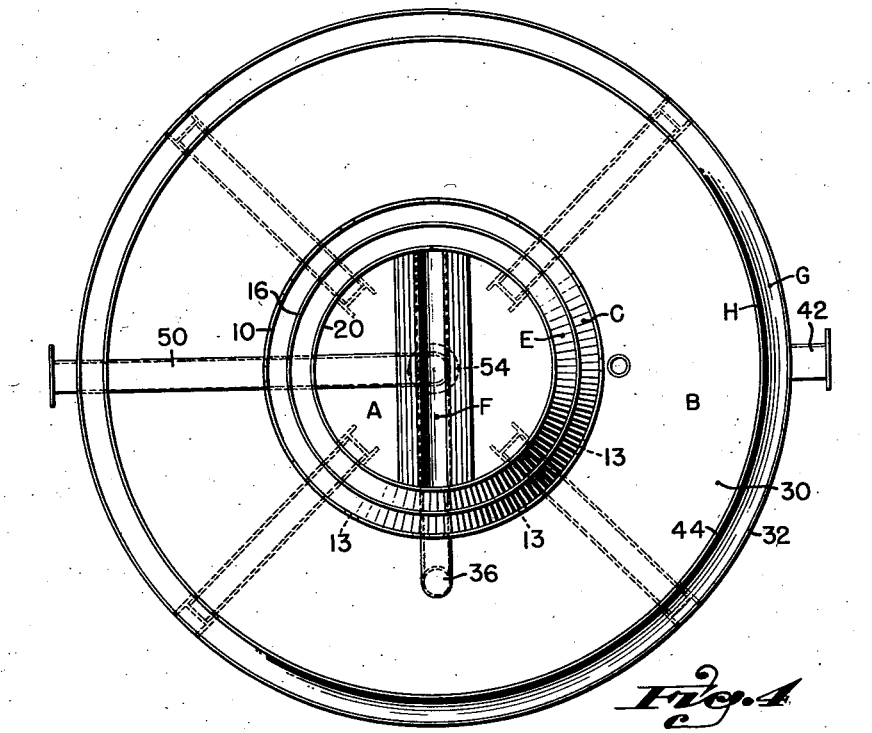
Fig. 4 is a top plan view of the unit of Fig. 3.

The purpose and function of trough F is to collect the floatable solid matter which rises to the top of the interior of the baffle member, said trough being connected to a suitable scum drain 36, note Figs. 1 and 4, through which the floating matter is conducted to a blow tank en route to a rendering process or for discard.

In the preferred embodiment of the invention suitable means, such as, by way of example, a rotatable skimmer blade 46, driven by a motor 48, is provided for positively skimming the floating solids and scum into trough F. It will be noted that the level of liquid within the central zone Z is determined by the elevation of peripheral weir D.

A second annular trough G is provided concentric with and disposed interiorly of cylindrical walls 32 of the aeration chamber, the lower wall 40 of said trough being downwardly inclined from a maximum elevation at one side to a minimum elevation at the opposite side where the effluent outlet 42 is located. This second annular trough includes an annular, continuous inner wall 44, the upper edge H defining a second peripheral weir located below edge D of the first peripheral weir, and in substantial alignment with the lower edge of the ports 13 in wall 10.

The numeral 50 denotes an influent distributor provided with an upturned outlet 52 located interiorly and centrally of the central zone Z of the settling chamber A and above lower edge 24 of the baffle member. In the preferred embodiment of the invention, a distributor plate 54 is secured to and in spaced axial alignment with outlet 52 for thereby deflecting the influent discharged through the upturned outlet downwardly and radially of the central zone.

In the operation of the device, the suspended solids contained within the influent denoted generally by arrows 11, Fig. 1, will be automatically separated therefrom in the settling chamber, the floatable solids denoted by the broken arrows 13 rising to the surface of the central zone from whence they will be skimmed by skimmer blade 46 into trough F. The heavier solid particles denoted by the arrows 15 will settle as a sludge Q, Fig. 1, through the open bottom of the baffle and be deposited onto the lower conical portion 12.

Suitable means, such as, by way of example, a gate valve 60, may be associated with the lower portion 12 of the settling chamber for enabling the sludge to be discharged continuously or at intervals to sludge drying beds 62 via suitable piping 64.

By reason of the unique baffle effect within chamber A, only clarified waste denoted by the arrows 17 will pass under lower edge 24 of the baffle member into and thence upwardly through annular passageway E to overflow upper edge D of the peripheral weir from whence it will be discharged via ports 13 into the aeration chamber B.

Figure 5:
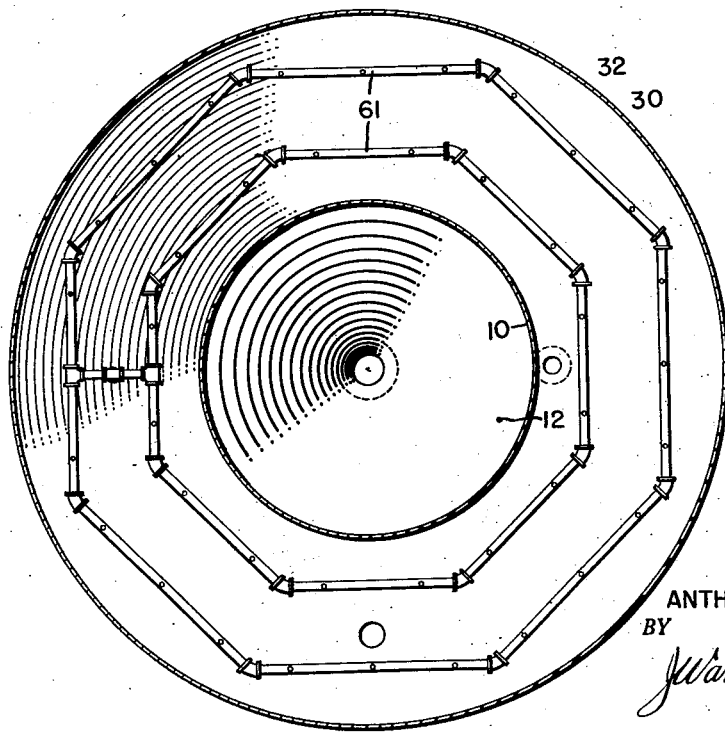
Fig. 5 is a view taken on line 5—5 of Fig. 3.

Suitable means such as pipes 61, best illustrated in Figs. 1 and 5, may be provided in the lower portion of chamber B for supplying and discharging quantities of air to the contents of said chamber. The purpose of supplying air to the clarified waste of the aeration chamber is to satisfy the oxygen demand of the waste for thereby rendering it stable so that it will not require and absorb further oxygen from the stream or sewer into which the stabilized effluent is finally discharged.

By reason of the extreme length of peripheral weir H, the stabilized effluent leaving chamber B will pass over the weir as a fine spray as it is discharged into the second annular chamber G.

It has been found that a unit, wherein the diameter of outer wall 32 of the aeration chamber approximates 15 feet, will satisfactorily handle an influent flow of from 30 to 50 gallons per minute, the complete cycle requiring about two and one-half hours.

Uniformly satisfactory results have been obtained in those instances wherein the area of the central zone Z is from 2½ to 4 times the area of the outer zone E, and wherein the area of the aeration chamber is from four to six times the area of the aforesaid central zone.

While the present invention is neither directed to nor concerned with the treatment to which the influent is subjected to before entering inlet 50, nor to the treatment to which the by-products are subjected after leaving the unit, I have in Fig. 1 diagrammatically indicated a typical layout for illustrating the manner in which my unit may be utilized in conjunction with the existing facilities found in the average meat processing plant.

With reference again to Fig. 3, it will be noted that peripheral weir D may be considered as comprising the upper end of the outer wall of the settling chamber A, and that second peripheral weir H may be considered as comprising the upper end of the outer wall of the aeration chamber B.

Preferably the entire unit may be mounted above the ground or other supporting surface 90 on suitable legs 92, thereby providing free and easy access to all parts of the unit.

It should be clearly understood that my apparatus and method are clearly distinguishable from the teachings of the Mallory U. S. Patent No. 2,227,099 in which influent is discharged into the top of a so-called preliminary mixed liquor receiving chamber the open lower end of which is literally embedded within a sludge blanket on the bottom of the settling chamber, and through which sludge blanket the clarified influent is caused to pass.

I separate the floatable solid particles from the heavier solid particles within central zone Z of the settling chamber A and the resultant clarified effluent passes under the lower edge 24 of the baffle member, thence into annular passageway E at a location an appreciable distance above the top of the sludge blanket Q in the bottom 12 of the chamber.

What is claimed is:

1. A unit for treating impure liquids containing suspended solids, said unit comprising a settling chamber having a cylindrical body portion above and in open communication with a conical sludge accumulator chamber, a sludge discharge port in the bottom of the sludge chamber, means normally closing said port, an aerating chamber circumscribing the settling chamber, a continuous, open-ended, imperforate baffle member extending downwardly into and concentrically of said chamber with the lower edge of the baffle spaced above the upper end of the sludge chamber, said baffle subdividing the settling chamber into a central zone entirely within the baffle and an outer zone exteriorly of the baffle with a passageway under the lower edge of the baffle of the settling chamber, the lower edge of the baffle member defining a barrier under which only the clarified effluent from the central zone passes directly to the outer zone above the sludge accumulated in the bottom of the settling chamber, an annular trough interiorly circumscribing the upper outer wall of said outer zone, said trough having a peripheral edge over which clarified effluent having passed under the lower edge of the baffle into the said outer zone is discharged, the height of said peripheral edge determining the height of liquid within the central zone, means for continuously withdrawing floatable solids from the upper portion of the central zone, means for discharging the clarified effluent from said trough to the aeration chamber, and means for radially introducing impure liquids containing suspended solids initially into the interior of said central zone at an elevation approximately midway between the bottom of the baffle and the peripheral edge of said first mentioned trough.

2. A unit for treating impure liquids containing suspended solids, said unit comprising a settling chamber having a cylindrical body portion above and in open communication with a conical sludge accumulator chamber, a sludge discharge port in the bottom of the sludge chamber, means normally closing said port, an aeration chamber secured to, carried by and circumscribing the settling chamber, a continuous, open-ended, imperforate baffle member extending downwardly into and concentrically of the settling chamber with the lower edge of the baffle member spaced above the convergent lower wall of the settling chamber by an amount greater than the maximum height of sludge accumulated in the bottom of the settling chamber, said baffle subdividinng that portion of the settling chamber remote from its lower walls into a central zone entirely within and defined by the baffle, and an outer zone exteriorly of the baffle with a passageway under the lower edge of the baffle between the same and the sludge accumulated in the bottom of the settling chamber, the lower edge of the baffle member defining a barrier under which only the clarified effluent from the central zone passes directly to the outer zone above the sludge accumulated in the bottom of the settling chamber, the upper end of the outer wall of the outer zone comprising a peripheral weir over which liquid rising in the outer zone is discharged into the aeration chamber, means for continuously discharging impure liquids containing suspended solids initially into the interior of the central zone, a scum trough in open communication with the upper portion of the central chamber into which the floatable solids from the impure waste discharged into the central zone are discharged, means associated with the lower wall of the settling chamber through which the heavier solid particles which settle out as sludge are withdrawn, and a peripheral weir defining the upper outer edge of the aeration chamber, the elevation of said last mentioned weir being less than the elevation of the first mentioned peripheral weir for providing an edge over which the aerated effluent will be discharged as a fine spray.

3. A unit for treating at atmospheric pressure impure liquids containing suspended solids, comprising a settling chamber having continuous side and bottom walls, and a continuous open-ended baffle member having imperforate side walls spaced from and concentric with the first mentioned side walls for defining a continuous annular passageway having an inner, lower peripheral edge and an outer, upper peripheral edge, an aeration chamber circumscribing said settling chamber, said aeration chamber including a bottom wall and an outer wall the upper edge of which defines a peripheral weir at an elevation below the outer upper peripheral edge of the said annular passageway, means for continuously discharging impure liquids containing suspended solids initially into the settling chamber, said means including an influent outlet located interiorly of the settling chamber and above the inner lower peripheral edge of the annular passageway, means for introducing aerating media into the lower portion of the aeration chamber, an overflow trough circumscribing the said peripheral weir, and an effluent outlet in open communication with the interior of said trough.

4. A unit as described in claim 3, wherein the area of the annular passageway is from 25% to 40% of the area of the settling chamber, and wherein the area of the aeration chamber is from 3 to 6 times the area of the settling chamber.

5. A unit for treating at atmospheric pressure impure liquids containing suspended solids, comprising a first open-topped chamber having a cylindrical body portion above and in open communication with a conical sludge accumulator chamber, a sludge discharge port in the bottom of the sludge chamber, means normally closing said port, a continuous open ended baffle member having side walls spaced from and concentric with the side walls of the first chamber and with the lower end of the baffle positioned interiorly of and terminating above the upper edge of the sludge chamber, and with the upper end of the baffle disposed above the upper edge of said first chamber, a second chamber circumscribing the first chamber, said second chamber including a bottom and an outer wall the upper edge of which defines a peripheral weir at an elevation below the upper edge of the first chamber, means for continuously discharging impure liquids containing suspended solids initially into the settling chamber, said means including an influent outlet located centrally of the first chamber and above the lower edge and interiorly of the baffle member, means for introducing an aerating media into the lower portion of the second chamber, an overflow trough circumscribing the said peripheral weir, an effluent outlet in open communication with the interior of said trough, a second trough spanning the baffle member with the upper edges of the trough located below the upper end of the baffle and above the upper edge of the first chamber, and means in open communication with said second trough through which floating matter from the interior of the baffle is discharged.

6. A unit for treating at atmospheric pressure impure liquids containing suspended solids, comprising a first open-topped chamber including a cylindrical body portion above and in open communication with a conical sludge-accumulator chamber, a sludge discharge port in the bottom of the sludge chamber, means normally closing said port, an annular trough concentric with and disposed interiorly of the cylindrical body portion of the first chamber, said trough including a continuous inner wall the upper edge of which defines a peripheral weir, a second chamber including side and bottom walls circumscribing the body portion of the first chamber with the bottom wall located adjacent the bottom end of the cylindrical body portion of said first chamber, a plurality of ports in the said cylindrical body portion through which fluids from the annular trough are discharged into the second chamber, the upper edge of the outer wall of the second chamber defining a second peripheral weir at an elevation below the first mentioned peripheral weir and in substantial alignment with the said ports, a continuous annular baffle member open at its upper and lower ends spaced from and concentric with the walls of the first chamber with the lower end of the baffle positioned interiorly of and terminating at an elevation above the lower end of the body cylindrical portion of the first chamber, and with the upper end of the baffle disposed above the upper edge of the said first peripheral weir, said baffle member defining a third chamber, means for continuously discharging impure liquids containing suspended solids initially into the settling chamber, said means including an upturned outlet located centrally of and above the lower edge of the third chamber and below the upper edge thereof, an axial trough spanning the upper portion of the third chamber with the upper edges of said trough located above the upper edge of said peripheral weir and means in open communication with said last mentioned trough through which floating matter which rises to the top of the third chamber is discharged.

7. A unit for treating at atmospheric pressure impure liquids containing suspended solids, comprising a first open-topped chamber having continuous side and bottom walls wherein the upper edge of the side walls defines a peripheral weir, a conical sludge-accumulator chamber disposed directly beneath and in open communication with said first chamber, a sludge discharge port in the bottom of the sludge chamber, means normally closing said port, a second chamber circumscribing the first chamber, said second chamber including a bottom and an outer wall the upper edge of which defines a second peripheral weir spaced from and at an elevation below the upper edge of the first chamber, an open-ended cylindrical baffle member mounted in and with its side walls spaced from and concentric with the side walls of the first chamber and with its lower end positioned interiorly of and terminating below the upper edge of the first chamber, and with its upper end disposed above the upper edge of said first chamber, for subdividing the first chamber into a central zone and an outer zone and with the first mentioned peripheral weir comprising the upper overflow edge of the outer zone, an overflow trough circumscribing the peripheral weir of the outer zone dimensioned to receive fluid overflowing said zone, said trough having a plurality of ports in open communication with the second chamber, means for continuously discharging impure liquids containing suspended solids initially into the settling chamber, said means including an influent outlet located interiorly of the central zone of the first chamber, means for introducing aerating media into the lower portion of the second chamber, an overflow trough circumscribing the second peripheral weir, and an effluent outlet in open communication with the interior of said trough.

8. A unit for treating at atmospheric pressure impure liquids containing suspended solids, comprising in combination a settling chamber having a cylindrical body portion above and in open communication with a conical sludge-accumulator chamber, a continuous, hollow, cylindrical, open-ended imperforate baffle member interiorly of, spaced from and concentric with the cylindrical body portion of the settling chamber providing a central zone interiorly of the baffle and an outer zone between the baffle and cylindrical body portion, a second chamber external of and completely circumscribing the cylindrical body portion of the settling chamber having a bottom wall located adjacent the upper end of the conical sludge-accumulator chamber and an upstanding outer wall in spaced parallelism with the cylindrical body portion of the settling chamber, a peripheral weir in said outer zone, means discharging fluid passing over said weir into the second chamber, a second peripheral weir circumscribing said second chamber at an elevation below the first weir, means collecting fluids passing over the second weir, a trough in the central zone having overflow edges at an elevation above the first weir, means discharging the contents of said trough, means for continuously discharging impure liquids containing suspended solids radially into the central zone at an elevation approximately midway between the bottom of the baffle member and the peripheral edge of the first weir, a sludge discharge port in the bottom of the sludge-accumulator chamber, and means normally closing said port.

9. A unit for treating at atmospheric pressure impure liquids containing suspended solids, comprising in combination a settling chamber having a cylindrical body portion above and in open communication with a conical sludge-accumulator chamber, a continuous, hollow, cylindrical, open-ended imperforate baffle member interiorly of, spaced from and concentric with the cylindrical body portion of the settling chamber providing a central zone interiorly of the baffle and an outer zone between the baffle and cylindrical body portion, an annular trough in said outer zone carried by, concentric with, disposed interiorly of and spaced downwardly from the free upper edge of the cylindrical body portion of the settling chamber, the upper edge of said trough defining a continuous peripheral weir, an aerating chamber external of and completely circumscribing the cylindrical body portion of the settling chamber having a bottom wall located adjacent the upper end of the conical sludge-accumulator chamber and an upstanding outer wall in spaced parallelism with the cylindrical body portion of the settling chamber, ports in said cylindrical body portion in open communication with said trough through which fluid passing over said weir is discharged radially into the aerating chamber, a second annular trough concentric with and disposed interiorly of the side wall of said aerating chamber, the upper edge of said second trough defining a second continuous peripheral weir circumscribing said aerating chamber at an elevation below the first weir and at the elevation of the ports in said cylindrical body portion, a third trough within the upper portion of the central zone having overflow edges at an elevation above the first weir, means continuously discharging the contents of said third trough, means for continuously discharging impure liquids containing suspended solids radially into the central zone at an elevation approximately midway between the bottom of the baffle member and the peripheral edge of the first weir, whereby the floatable solids will rise upwardly through the central zone and thence into said third trough as the heavier solids gravitate out of the central zone into the sludge accumulator chamber, the lower edge of the baffle defining a barrier under which only the clarified effluent from the central zone passes upwardly into the outer zone, the excess of clarified effluent passing over the first peripheral weir into the first trough and thence through said ports into the second chamber, the excess effluent from the second chamber passing over the second peripheral weir as a spray which is collected in the second trough, a sludge discharge port in the bottom of the sludge-accumulator chamber, and means normally closing said port.

References Cited in the file of this patent
UNITED STATES PATENTS

| | | |
|---|---|---|
| 2,223,257 | Mallory | Nov. 26, 1940 |
| 2,233,792 | Mallory | Mar. 4, 1941 |
| 2,285,697 | Durdin | June 9, 1942 |
| 2,375,282 | Clemens | May 8, 1945 |
| 2,436,375 | Booth et al. | Feb. 24, 1948 |
| 2,492,486 | Kivari et al. | Dec. 27, 1949 |
| 2,713,026 | Kelly et al. | July 12, 1955 |